US011917007B2

United States Patent
Jurthe et al.

(10) Patent No.: US 11,917,007 B2
(45) Date of Patent: Feb. 27, 2024

(54) METHOD FOR OPERATING A DATA NETWORK OF A MOTOR VEHICLE AND MOTOR VEHICLE COMPRISING A DATA NETWORK WHICH CAN BE CORRESPONDINGLY OPERATED

(71) Applicant: Volkswagen Aktiengesellschaft, Wolfsburg (DE)

(72) Inventors: Sascha Jurthe, Hattingen (DE); Thomas Grummel, Holle (DE); Stefan Bosse, Holle (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 513 days.

(21) Appl. No.: 17/413,562

(22) PCT Filed: Nov. 26, 2019

(86) PCT No.: PCT/EP2019/082573
§ 371 (c)(1),
(2) Date: Oct. 19, 2021

(87) PCT Pub. No.: WO2020/120126
PCT Pub. Date: Jun. 18, 2020

(65) Prior Publication Data
US 2022/0201079 A1 Jun. 23, 2022

(30) Foreign Application Priority Data
Dec. 14, 2018 (DE) .......................... 102018221742.4

(51) Int. Cl.
*H04L 67/12* (2022.01)
*H04W 12/088* (2021.01)
(Continued)

(52) U.S. Cl.
CPC ............... *H04L 67/12* (2013.01); *H04W 8/22* (2013.01); *H04W 12/088* (2021.01); *H04W 48/02* (2013.01); *H04W 84/12* (2013.01)

(58) Field of Classification Search
CPC ...... H04L 67/12; H04W 12/088; H04W 8/22; H04W 48/02; H04W 84/12
See application file for complete search history.

(56) References Cited

U.S. PATENT DOCUMENTS

2004/0259545 A1* 12/2004 Morita ................ H04W 12/068
 455/411
2005/0249351 A1* 11/2005 Miyahara ................ G08G 1/20
 380/255
(Continued)

FOREIGN PATENT DOCUMENTS

DE 102005039343 A1 2/2007
DE 102015113631 A1 3/2016
(Continued)

OTHER PUBLICATIONS

PCT/EP2019/082573. International Search Report, (dated Jan. 28, 2020).
DE102018221742.4. Examination Report (dated Nov. 16, 2021).

*Primary Examiner* — Brenda H Pham
(74) *Attorney, Agent, or Firm* — Peter Zura; LOZA & LOZA, LLP

(57) ABSTRACT

Operating a data network of a motor vehicle, the data network being used by at least one mobile terminal that is external to the vehicle. Respective identification data of at least one terminal are recorded, on the basis of the identification data for the at least one terminal, a respective selection element is displayed and each terminal, the associated selection element of which is selected, is registered (Continued)

and each registered terminal is entered in a blocking function of an Internet routing service.

20 Claims, 3 Drawing Sheets

(51) Int. Cl.
*H04W 8/22* (2009.01)
*H04W 48/02* (2009.01)
*H04W 84/12* (2009.01)

(56) References Cited

U.S. PATENT DOCUMENTS

| | | | |
|---|---|---|---|
| 2007/0038342 A1* | 2/2007 | Grana | G07C 5/008 73/114.61 |
| 2012/0135683 A1 | 5/2012 | Lee et al. | |
| 2014/0295830 A1 | 10/2014 | Oerton | |
| 2014/0306826 A1 | 10/2014 | Ricci | |
| 2014/0328248 A1* | 11/2014 | Greubel | H04W 8/005 370/328 |
| 2015/0081382 A1* | 3/2015 | L'Heureux | G06Q 30/0261 705/7.29 |
| 2016/0113043 A1 | 4/2016 | O'Brien et al. | |
| 2018/0034919 A1 | 2/2018 | Thanayankizil | |
| 2018/0059913 A1 | 3/2018 | Penilla et al. | |

FOREIGN PATENT DOCUMENTS

| | | |
|---|---|---|
| DE | 102017100545 A1 | 8/2017 |
| DE | 102017117039 A1 | 2/2018 |
| DE | 102017202022 A1 | 8/2018 |
| WO | 2007020185 A1 | 2/2007 |
| WO | 2017058925 A1 | 4/2017 |

* cited by examiner

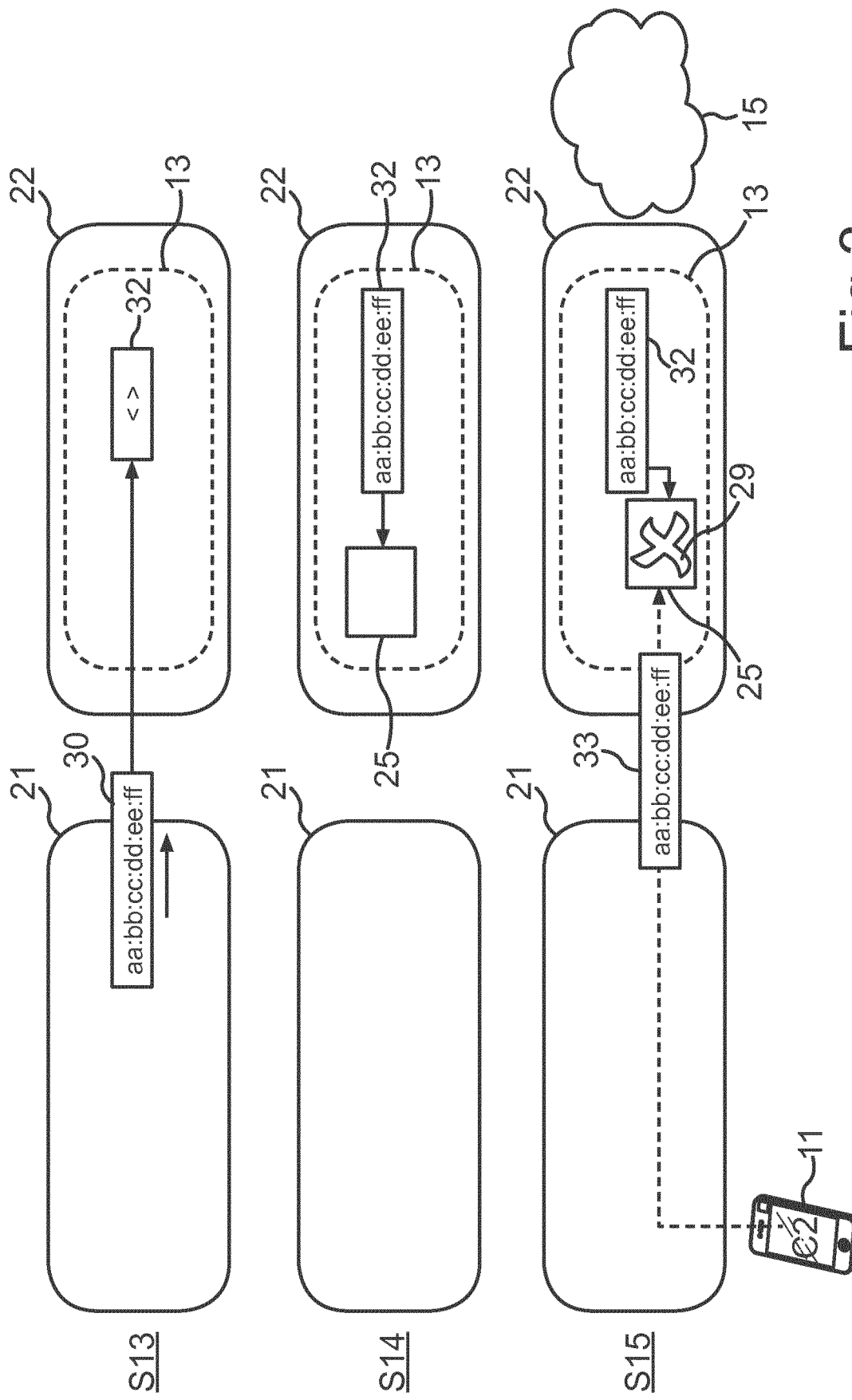

METHOD FOR OPERATING A DATA NETWORK OF A MOTOR VEHICLE AND MOTOR VEHICLE COMPRISING A DATA NETWORK WHICH CAN BE CORRESPONDINGLY OPERATED

CROSS REFERENCE TO RELATED APPLICATION

The present application claims priority to International Patent Application No. PCT/EP2019/082573 to Jurthe, et al., filed Nov. 26, 2019, titled "Method for Operating a Data Network of a Motor Vehicle and Motor Vehicle Comprising a Data Network Which Can be Correspondingly Operated", which claims priority to German Patent Application no. 10 2018 221 742.4, to Jurthe, et al., filed Dec. 14, 2018, the contents of each being incorporated by reference in their entirety herein.

TECHNICAL FIELD

The present disclosure relates to a technologies and techniques for operating a data network for a motor vehicle. Such a data network can be implemented on the basis of an IP (internet protocol). At least one mobile end device, which is not part of the vehicle, such as a smartphone or tablet, can be connected to or integrated in the data network. A motor vehicle is also contemplated in the present disclosure, which has a data network operated in accordance with the configurations disclosed herein.

BACKGROUND

Internet access can be provided for a mobile end device in a vehicle. An internet routing service can be provided in the data network for operating an internet connection, which can provide the internet connection between a local data network in the motor vehicle and the internet using a mobile wireless modem incorporated in the motor vehicle.

There can be a wireless interface, e.g., in the form of a so-called WLAN access point (WLAN: wireless local area network) for connecting a mobile end device to this data network. This interface advantageously offers a faster or more stable internet connection for a mobile end device when accessing the internet via the mobile wireless modem in the vehicle, or belonging to the vehicle, than a direct connection to the internet through a mobile end device. A mobile end device can also be connected to the internet and still use at least a local data service for the motor vehicle's own data network. One example of such a data service is so-called "rear seat entertainment," such as media content displayed to passengers sitting in the rear of the motor vehicle.

The disadvantage of a data network in a motor vehicle that has an internet connection, such as an internet routing service, is that the data transfer of internet data is billed on the basis of volume, such that an uncontrolled data transfer by a mobile end device that is not being monitored can result in excessive costs, or depletion of a data volume.

It is known from WLAN routers for buildings that these can block WLAN interfaces for individual mobile end devices. This leads to an undesired side effect in a motor vehicle, however, that a vehicle's internal data service would no longer be available to this mobile end device. A complete blocking of WLAN access is therefore to be avoided, because a vehicle user should always be able to access a local or vehicle's internal data service via a wireless interface with a mobile end device. Thus, the control of the internet access from the data network in the vehicle is one of the main considerations.

It is known in the art to block internet access for individual users on an individual basis, for which individual authentication data are assessed, e.g. on the basis of the standard 802.1x. However, this requires excessive administrative effort due to the complexity of the monitoring.

A data network of this type is known from U.S. Pat. No. 9,607,499 B1. Communication by mobile end devices with all other devices is monitored in this known data network, resulting in a resource-draining control of the communication channels.

Connection of a mobile end device to a data network in a motor vehicle via a WLAN interface is known from US 2018/0034919 A1.

A router is known from WO 2007/020185 A1, which can control individual access by mobile end devices to the internet.

An aspect of the present disclosure is to operate a data network in a motor vehicle and thereby ensure the availability of at least one vehicle-internal data service to at least one mobile end device, and simultaneously maintain control over internet use.

Aspects of the subject matter of the present disclosure are defined in the independent claims. Advantageous embodiments and aspects of the present disclosure are also described in the dependent claims, the following description, and the figures.

SUMMARY

The present disclosure provides technologies and techniques for operating a data network in a motor vehicle. Some configurations assume that the data network is used by at least one mobile end device not belonging to the motor vehicle. This mobile end device can be, e.g., a smartphone, tablet, or smartwatch. An internet routing service for data transfer of internet data between the data network and the internet may be operated in the data network. An internet connection may be provided by the internet routing service, via which internet data can be transferred from the data network to the internet and/or from the internet to the data network. A mobile end device connected to the data network can thus exchange internet data with the internet. At least one local or vehicle-internal data service other than the internet routing service may be operated in the data network. This vehicle-internal data service can include media output, for example. A wireless interface may be used to connect the at least one mobile end device to the data network. By way of example, the wireless interface can be provided by a WLAN network. This may be configured as a WLAN wireless interface.

As a result, a mobile end device can access the data network via the wireless interface, and use the at least one vehicle-internal data service there. Furthermore, the internet routing service can be accessed from the data network. The control over the internet routing service then monitors access to the internet routing service by the at least one mobile end device, allowing or blocking this access in a targeted manner.

In some examples, identification data for the at least one mobile end device may be obtained via the wireless interface. The identification data identifies the mobile end device. A respective selection element may be displayed on an operating device in the vehicle on the basis of the identification data for the at least one mobile end device. By way of example, a list can be shown, in which each mobile end device identified or detected on the wireless interface may be listed, such that each entry can function as a selection element. Each mobile end device that is then selected through its associated selection element with a user input in the operating device, e.g., by clicking on it, is then registered. "Registering" means that the selection of the respective mobile end device is detected or stored.

Each registered mobile end device may be then entered in a blocking function in the internet routing service. The internet routing service is thus configured to filter data transfer of internet data, or to ensure that data is only transferred if the blocking function allows or accepts data transfer for a specific mobile end device. The blocking function blocks internet service for each mobile end device that is entered therein, and allows internet service for all of the other mobile end devices. As a result, only those mobile end devices not entered in the blocking function can use the internet connection, i.e., use or demand the internet routing service for data transfer of internet data. The internet routing service is therefore normally enabled, and may be only blocked for those mobile end devices that have been selected. Alternatively, the blocking function can also be used to only allow the internet routing service for each mobile end device that may be entered therein. In other words, selection of respective selection elements through user input then actively determines which mobile end devices may use the internet routing service. The internet routing service is then normally blocked, and may be only enabled for each mobile end device that has been selected. In the first case (standard permission), the internet routing service can be used by every mobile end device, unless a user selects a mobile end device through a user input for which the internet routing service is then blocked. In the second case (standard blocking), it may be ensured that no mobile end device can use the internet routing service unless it has been selected by a user input. This ensures that a mobile end device does not accidently use the internet routing service just because it has been overlooked.

The present disclosure advantageously provides that the data network and therefore the at least one data service available for every mobile end device in the vehicle may be available to the at least one mobile end device, and a user can determine, by means of a user input, which of the other mobile end devices can also use the internet routing service, e.g., for which mobile end devices the internet routing service is to be enabled, separately from the data service in the vehicle, by selecting a respective selection element. The internet routing service can therefore be separately monitored or set for each mobile end device, without impairing the use of the at least one data service in the vehicle.

The identification data for the at least one mobile end device may include a respective MAC address (MAC: media access control) for the respective mobile end device in the present disclosure. The MAC address may be dedicated or assigned to a hardware in the mobile end device, or entered in this hardware. This use of the MAC address prevents circumvention of the blocking function.

The at least one data service in the vehicle may be enabled for the at least one mobile end device independently of the internet routing service in the present disclosure. In other words, entry of a mobile end device in the blocking function for the internet routing service does not affect or impair the use of the at least one vehicle-internal data service by the at least one mobile end device.

The present disclosure also contains embodiments and examples that result in additional advantages.

In one example, each mobile end device entered in the blocking function remains entered therein, even after restarting the motor vehicle. In other words, the selection made by a user through a user input on the operating device is not lost when the motor vehicle is shut off. This ensures that unwanted internet use is not enabled by restarting the motor vehicle.

In one example, the blocking function remains in effect for each mobile end device that is entered therein until the selection of the selection element belonging to the respective mobile end device may be cancelled by another user input in the operating device. The entry in the blocking function may be then deleted. Consequently, the entry may be only deleted if a user intentionally cancels the selection of the respective mobile end device with another user input. This prevents an unintentional access to or enabling of the internet routing service.

In another example, the blocking function may be implemented with a firewall, through which data transfer of the internet data takes place. A firewall can be implemented on the basis of a filtering or blocking of data packets that have a predefined IP address, such that the IP addresses for each of the mobile end devices entered in the blocking function are then blocked or disabled. Additionally or alternatively, filtering can take place on the basis of the respective MAC address for each mobile end device entered in the blocking function.

There are also an embodiment relating to the at least one data service in the vehicle in which the at least one vehicle-internal data service comprises a streaming service for media data (e.g., audio and/or video), and/or a data transfer between two mobile end devices (e.g., camera data for baby monitoring functions), and/or data transfer of at least one file and/or remote control of at least one vehicle function in the motor vehicle by a mobile end device.

These data services can be provided in the motor vehicle without using the internet routing service, i.e., without costs for internet access.

In another example, a mobile wireless modem may be used to access the internet routing service. This mobile wireless modem can provide a mobile wireless connection to a mobile wireless network, via which an internet connection can then be provided or accessed.

A motor vehicle that has the data network described herein is also contemplated in the present disclosure. The motor vehicle may be configured to operate the data network according to an embodiment of the method according to the present disclosure. A control unit that can execute the steps of the method described herein can be used for this. A human-machine interface, e.g., a touchscreen and/or at least one button can be used for the operating device. The user input can be implemented, for example, in an infotainment system in the motor vehicle. The at least one data service in the vehicle can be implemented or provided by at least one control unit in the motor vehicle. The data network can be located within a single control unit, or it can comprise a composite of numerous control units.

The present disclosure also comprises combinations of the features of the embodiments described herein.

BRIEF DESCRIPTION OF THE DRAWINGS

Exemplary embodiments of the present disclosure shall be described below in reference to the following figures. Therein:

FIG. 3 shows a schematic illustration of an entry of at least one mobile end device in a blocking function for an internet routing service, wherein the entry can take place on the basis of the selection, as described in reference to FIG. 2 according to some aspects of the present disclosure.

DETAILED DESCRIPTION

The exemplary embodiments described below are preferred embodiments of the present disclosure. The components described in reference to the exemplary embodiments each represent individual features of the present disclosure that are to be regarded independently of one another, which each also form an independent part of the present disclosure and are therefore to be regarded individually or in a combination other than that shown as part of the present disclosure. Furthermore, the embodiments described herein can also be supplemented by other features of the present disclosure described herein.

Elements having the same functions are given the same reference symbols in the figures.

Figure 1:
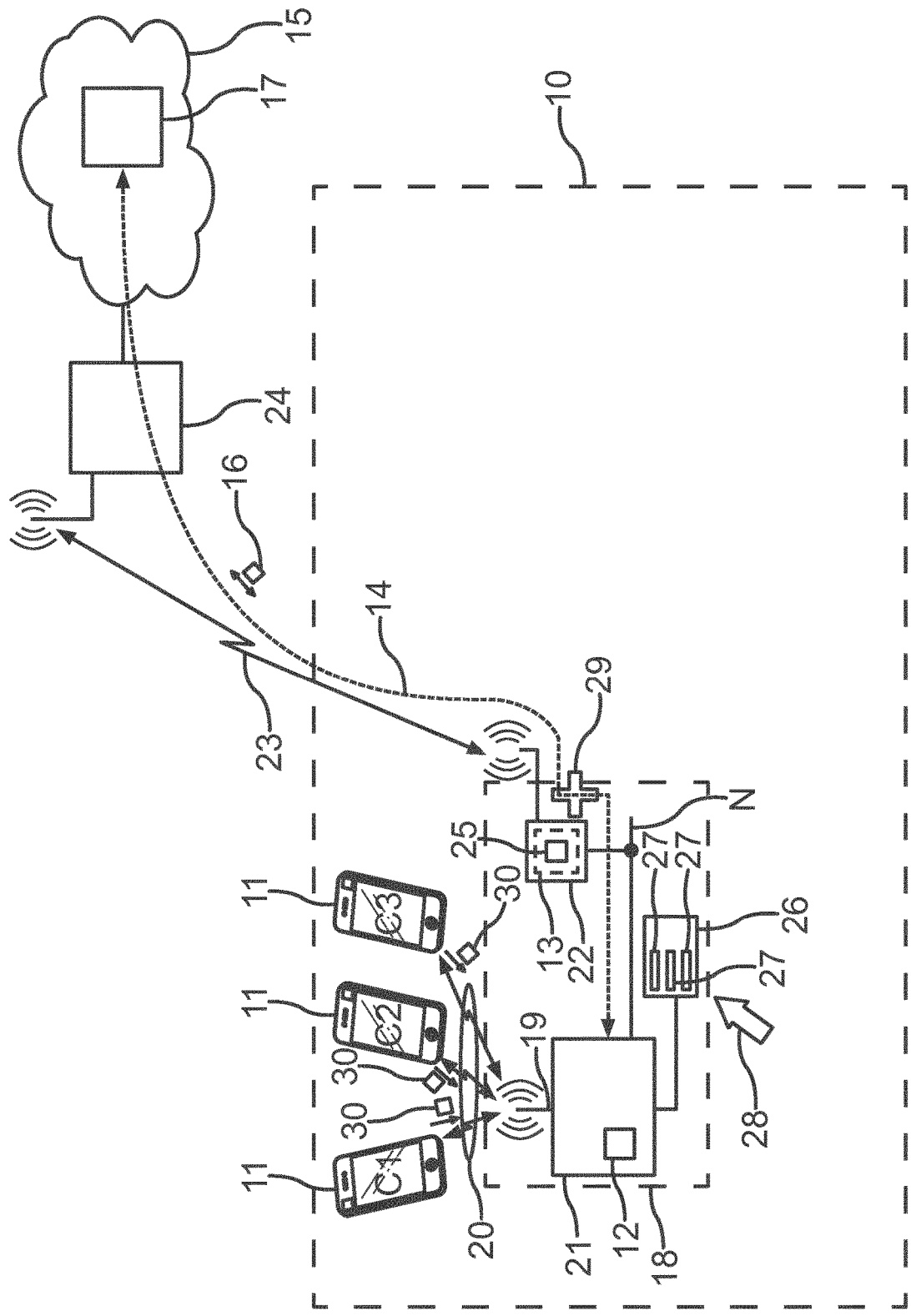
FIG. 1 shows a schematic illustration of an embodiment of the motor vehicle according to one aspect the present disclosure.

FIG. 1 shows a motor vehicle 10, which can be an automobile, such as a passenger automobile or truck, or a van. The use of at least one mobile end device 11 by at least one occupant in the motor vehicle 10 may be supported in the motor vehicle 10. The mobile end device 11 can be a smartphone, tablet or smartwatch, for example. The respective mobile end device 11 can be supported by the motor vehicle 10 in that at least one vehicle-internal data service 12 may be provided, e.g., a streaming service for media data, and/or data transfer between two mobile end devices 11, and/or remote control or wireless operation of at least one function in the motor vehicle 10 by the mobile end device 11. There can also be an internet routing service 13 in the motor vehicle 10, with which an internet connection 14 to the internet 15 can be obtained, such that internet data 16 can be exchanged or transferred between a respective mobile end device 11 and the internet, e.g., an internet server 17, via the internet routing service 13.

In some examples, a data network 18 may be configured in the motor vehicle for the at least one vehicle-internal data service 12 and the internet routing service 13, to which the at least one mobile end device 11 can be connected via a wireless interface 19 by means of a respective wireless connection 20. The wireless interface 19 can be implemented on the basis of WLAN technology, for example. The wireless interface 19 can be provided, e.g., by a control unit 21 functioning as a so-called hot spot for the motor vehicle 10.

The internet routing service 13 for the internet connection 14 can be provided by the same control unit 21, or by another control unit 22, as shown in FIG. 1. A wireless connection 23 to a mobile wireless network 24 can be established or operated by a mobile wireless modem for the data network 18 in the control unit 22, for example, to obtain the internet connection 14.

For the operation of the data network 18, a user of a mobile end device 11, or numerous mobile end devices 11, may want to prevent or disable use of the internet routing service 13. This should still allow use of the at least one vehicle-internal data service 12 by these mobile end devices 11.

The internet routing service 13 may be configured with a blocking function 25 for this. An operating device can be provided for configuring the blocking function 25, for example, to enter a mobile end device for which the internet connection 14 is to be either enabled or blocked, which can contain a touchscreen for displaying at least one selection element 27 and receiving a user input 28. The operating device 26 can be for, e.g., an infotainment system for the motor vehicle 10. If a user selects a selection element 27 by means of the user input 28, a mobile end device 11 assigned to the selected selection element 27 can be registered, e.g., for a blocking or enabling of the internet connection. It shall be assumed in the following that a selection can result in blocking. Each registered mobile end device 11 can be entered or listed in the blocking function 25. The internet routing service 13 for these mobile end devices 11 can then be disabled or blocked 29 by the blocking function 25.

Figure 2:
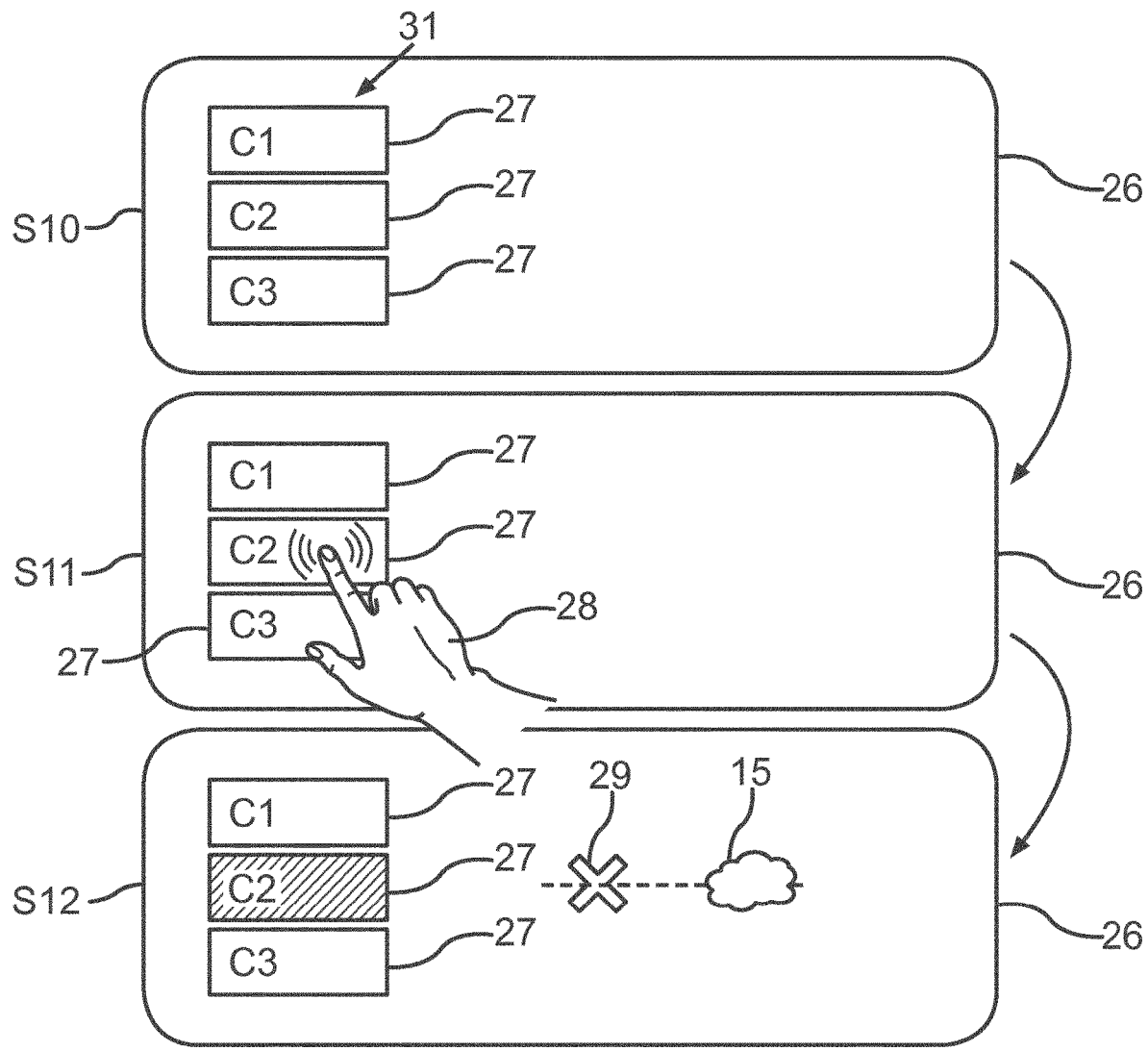
FIG. 2 shows a schematic illustration of an operating device for the motor vehicle in FIG. 1 during a selection process in which a selection element may be selected by a user input according to some aspects of the present disclosure.

FIG. 2 illustrates how the data network 18 in the motor vehicle 10 can be operated in order to disable or block the internet routing service 13 in a targeted manner for a single mobile end device 11.

Respective identification data 30 for the respective mobile end device 11 can be obtained through the wireless interface 19 (see FIG. 1) in step S10. A list 31 of the available mobile end devices 11 can be provided by the operating device 26 on the basis of the identification data 30. The mobile end devices 11 are distinguished in FIG. 1 and FIG. 2 by respective individual identity information or labels, C1, C2, C3. The list can comprise the selection elements 27 by which a respective mobile end devices 11 are identified distinguished. By way of example, each mobile end device 11 can be referred to as a participant or client.

Each mobile end device 11 can be registered for blocking by selecting its associated selection element 27 in the operating device 26 through a user input 28 in step S11. A user can select or tap on the associated selection element 27, for example, when the operating device 26 displays the selection element 27 on a touchscreen. In FIG. 2, this is shown in the figure as the mobile end device 11 with the symbol C2.

Each registered mobile end device 11 can be entered in the blocking function 25 for the internet routing service 13 in step S12, resulting in the blocking function 25 blocking the internet routing service 13 for the respective mobile end device entered therein. The operating device 26 can then display to the user, which end devices 11 are currently blocked from using the internet connection 14 to the internet 15. The user then knows which selection element 27 needs to be selected or tapped to disable or deactivate the blocking 29 of this mobile end device 11. The blocking 29 can also be maintained or saved after the motor vehicle 10 has been shut off.

FIG. 3 shows step S12 in greater detail, broken down into numerous steps.

In this example, each registered end device 11 blocked 29 by the user may be then specified or indicated in the second control unit 22 that has the internet routing service 13 in the variation with two control units 21, 22. The identification data 30 for the registered end device 11, the end device labeled C2 in the example, can be indicated for this. The control units 21, 22 can be coupled for this via a network connection N. The network connection N can be obtained, e.g., using a network cable (e.g., an ethernet cable) and/or a wireless connection.

The internet routing service 13 can have a list 32 in which all of those mobile end devices 11 that are blocked 29 from the internet routing service are listed or entered. If the internet data 16 for a mobile end device 11, e.g. the end device labelled C2, are indicated in step S13, the registered mobile end device 11 can be entered in the list 32 in step S14. As a result, the blocking function 24 may be configured to block the internet routing service 13 for this mobile end device 11. If such a mobile end device 11 (labelled C2 here) wants to transfer a data packet 33, identified with its identification data, e.g., the MAC address, in the internet 15, the blocking function 25 realizes in step S15 that this is a data packet 33 from a mobile end device 11 for which the internet routing service 13 is blocked.

A mobile end device 11 can remain in the list 32 until the user deselects the mobile end device 11, as described in reference to FIG. 2.

In some examples, the motor vehicle 10 offers the user the option of displaying all of the clients or end devices 11 connected to the WLAN network in the motor vehicle 10 (e.g., on the screen for the infotainment system, such as an HMI). The user can then select one or more of these end devices 11 for the WLAN connection from this list that are not to be allowed access to the internet 15 via the internet routing service. They are identified on the basis of their MAC addresses, and the data network blocks internet access for clients or end devices 11 with these MAC addresses.

In this example, instead of blocking access to the entire WLAN network, only access to the internet routing service is blocked, while local data services (e.g., rear seat entertainment) therefore remain available.

The end devices 11 currently connected to the WLAN are displayed on the HMI in the infotainment system. The user selects the WLAN end device that he or she wants to block. The MAC addresses belonging to the WLAN end devices are determined in the application software for the infotainment system, and registered with the networking software as "to be blocked" in the internet routing service. All packets that are to be routed from these MAC addresses to addresses outside the local network are discarded in the networking software (e.g., in the framework of a firewall).

It should be emphasized here that the application software for the vehicle-internal data service and networking software do not need to be contained in the same control unit. User interactions and the effects thereof may be obtained through different control units.

The user interactions and actual effects thereof (blocking a client) do not have to be implemented in different control units. Both can also be implemented in one control unit.

Some of the advantages of such configurations over known approaches is that it is possible to block only a partial aspect (internet routing) of the communication of a WLAN client, while local communication remains unaffected. The system also does not need complicated role or rights assignments (as would be necessary with an 802.1x authentication, for example).

On the whole, this example shows how a method for blocking internet access for WLAN clients in a motor vehicle can be obtained with the present disclosure. The respective data packet 33 may be blocked accordingly, e.g., deleted or discarded, by the blocking 29.

This disclosure is not limited to the exemplary embodiments described herein. Various adjustments and modifications can be made that the person skilled in the art would regard as belonging to the disclosure based on expert knowledge.

All of the examples specified herein, as well as certain formulations, are to be understood as not limited to these specifically listed examples.

It should be understood that the proposed method and the associated devices can be implemented in various forms of hardware, software, firmware, or special processors, or in combinations thereof. Special processors can comprise application-specific integrated circuits (ASICs), reduced instruction set computers (RISCs), and or field-programmable gate arrays (FPGAs). The proposed embodiments of the method and the device can be implemented as combinations of hardware and software. The software can be installed on a program storage device as an application program. This is typically a computer platform machine containing hardware, e.g., one or more central processing units (CPUs), a random-access memory (RAM), and one or more input/output interfaces (I/O interfaces). An operating system is also normally installed on such a computer platform. The various processes and functions described herein can be part of the application program, or a part executed via the operating system.

LIST OF REFERENCE SYMBOLS 10 motor vehicle
11 mobile end device
12 data service
13 internet routing service
14 internet connection
15 internet
16 internet data
17 server
18 data network
19 wireless interface
20 vehicle function
21 control unit
22 control unit
23 wireless connection
24 mobile wireless network
25 blocking function
26 operating device
27 selection element
28 user input
29 blocking
30 identification data
31 list
32 list
33 data packet
C1-3 identification information
N network connection

The invention claimed is:

1. A method for controlling data communication of a motor vehicle data network comprising an internet routing service and a vehicle-internal data service, comprising:
receiving respective identification data via a wireless interface for a plurality of mobile end device, wherein the identification data comprises a respective MAC address for each of the plurality of mobile end devices;
displaying, via an operating device of the motor vehicle, respective selection elements on the basis of the received identification data of the plurality of mobile end devices;

registering an input on one of the selection elements to select one of the plurality of mobile end devices;

entering a blocking function for the internet routing service for the selected one of the plurality of mobile devices based on the registered input, wherein the blocking function blocks the internet routing service for the selected one of the plurality of mobile devices, and enabling the internet routing service for another of the plurality of mobile end devices, or enables the internet routing service for the selected one of the plurality of mobile devices, and enabling vehicle-internal data service independently of the internet routing service for the another of the plurality of mobile end devices.

2. The method of claim 1, wherein registering the input comprises storing the input, such that the registered input remains stored even after the motor vehicle is restarted.

3. The method of claim 1, wherein each mobile end device entered in the blocking function remains entered therein until the selection of the selection element belonging to the respective entered mobile end device has been cancelled by a further user input, and the entry in the blocking function is then deleted.

4. The method of claim 1, wherein entering the blocking function comprises implementing a firewall, through which data transfer of internet data is carried out.

5. The method of claim 1, wherein the vehicle-internal data service comprises at least one of a streaming service for media data and/or data transfer between at least two of the plurality of mobile end devices, and/or remote control of at least one vehicle function by a mobile end device.

6. The method of claim 1, wherein the wireless interface comprises a wireless local area network (WLAN) network interface.

7. The method of claim 1, wherein the internet routing service comprises a mobile wireless network.

8. The method of claim 1, wherein entering the blocking function comprises determining if the respective MAC address of the selected one of the plurality of mobile devices is transmitting a data packet and blocking transmission of the data packet on the internet routing service.

9. A system for controlling data communication of a motor vehicle data network comprising an internet routing service and a vehicle-internal data service, comprising:

a wireless interface for receiving respective identification data for a plurality of mobile end device, wherein the identification data comprises a respective MAC address for each of the plurality of mobile end devices;

an operating device, operatively coupled to the wireless interface, the operating device configured to display respective selection elements on the basis of the received identification data of the plurality of mobile end devices, and register an input on one of the selection elements to select one of the plurality of mobile end devices; and a blocking device for entering a blocking function for the internet routing service for the selected one of the plurality of mobile devices based on the registered input, wherein the blocking function blocks the internet routing service for the selected one of the plurality of mobile devices, and enabling the internet routing service for another of the plurality of mobile end devices, or enables the internet routing service for the selected one of the plurality of mobile devices, and enabling vehicle-internal data service independently of the internet routing service for the another of the plurality of mobile end devices.

10. The system of claim 9, wherein the operating device is configured to register the input by storing the input, such that the registered input remains stored even after the motor vehicle is restarted.

11. The system of claim 9, wherein each mobile end device entered in the blocking function remains entered therein until the selection of the selection element belonging to the respective entered mobile end device has been cancelled by a further user input, and the entry in the blocking function is then deleted.

12. The system of claim 9, wherein entering the blocking function comprises implementing a firewall, through which data transfer of internet data is carried out.

13. The system of claim 9, wherein the vehicle-internal data service comprises at least one of a streaming service for media data and/or data transfer between at least two of the plurality of mobile end devices, and/or remote control of at least one vehicle function by a mobile end device.

14. The system of claim 9, wherein the wireless interface comprises a wireless local area network (WLAN) network interface.

15. The system of claim 9, wherein the internet routing service comprises a mobile wireless network.

16. The system of claim 9, wherein the blocking device is configured to enter the blocking function by determining if the respective MAC address of the selected one of the plurality of mobile devices is transmitting a data packet and blocking transmission of the data packet on the internet routing service.

17. A method for controlling data communication of a motor vehicle data network comprising a mobile wireless network and a vehicle-internal data service, comprising:

receiving respective identification data via a wireless local area network (WLAN) network interface for a plurality of mobile end device, wherein the identification data comprises a respective MAC address for each of the plurality of mobile end devices;

displaying, via an operating device of the motor vehicle, respective selection elements on the basis of the received identification data of the plurality of mobile end devices;

registering an input on one of the selection elements to select one of the plurality of mobile end devices;

entering a blocking function for the internet routing service for the selected one of the plurality of mobile devices based on the registered input, wherein the blocking function blocks the mobile wireless network for the selected one of the plurality of mobile devices, and enabling the internet routing service for another of the plurality of mobile end devices, or enables the mobile wireless network for the selected one of the plurality of mobile devices, and enabling vehicle-internal data service independently of the internet routing service for the another of the plurality of mobile end devices.

18. The method of claim 17, wherein entering the blocking function comprises implementing a firewall, through which data transfer of internet data is carried out.

19. The method of claim 17, wherein the vehicle-internal data service comprises at least one of a streaming service for media data and/or data transfer between at least two of the plurality of mobile end devices, and/or remote control of at least one vehicle function by a mobile end device.

20. The method of claim 17, wherein entering the blocking function comprises determining if the respective MAC address of the selected one of the plurality of mobile devices is transmitting a data packet and blocking transmission of the data packet on the mobile wireless network.

\* \* \* \* \*